H. E. SMITH.
Thrashing Machine.

No. 20,449.

Patented June 1, 1858.

UNITED STATES PATENT OFFICE.

H. E. SMITH, OF PHILADELPHIA, PENNSYLVANIA.

THRESHING-MACHINE.

Specification of Letters Patent No. 20,449, dated June 1, 1858.

*To all whom it may concern:*

Be it known that I, HAMILTON E. SMITH, of the city and county of Philadelphia and State of Pennsylvania, have invented certain new and useful Improvements in Threshing-Machines; and I do hereby declare the following to be a full, clear, and exact description of the same, reference being had to the accompanying drawing and to the letters of reference marked thereon.

My invention consists in arranging the concave of a threshing machine in respect to the spiked roller substantially in the manner set forth hereafter in order that the stalks of the grain may pass freely and unbroken, while the heads are being acted upon by the cylinder and concave.

In order to enable others skilled in the art to make and use my invention, I will now proceed to describe its construction and operation.

Figure 1:
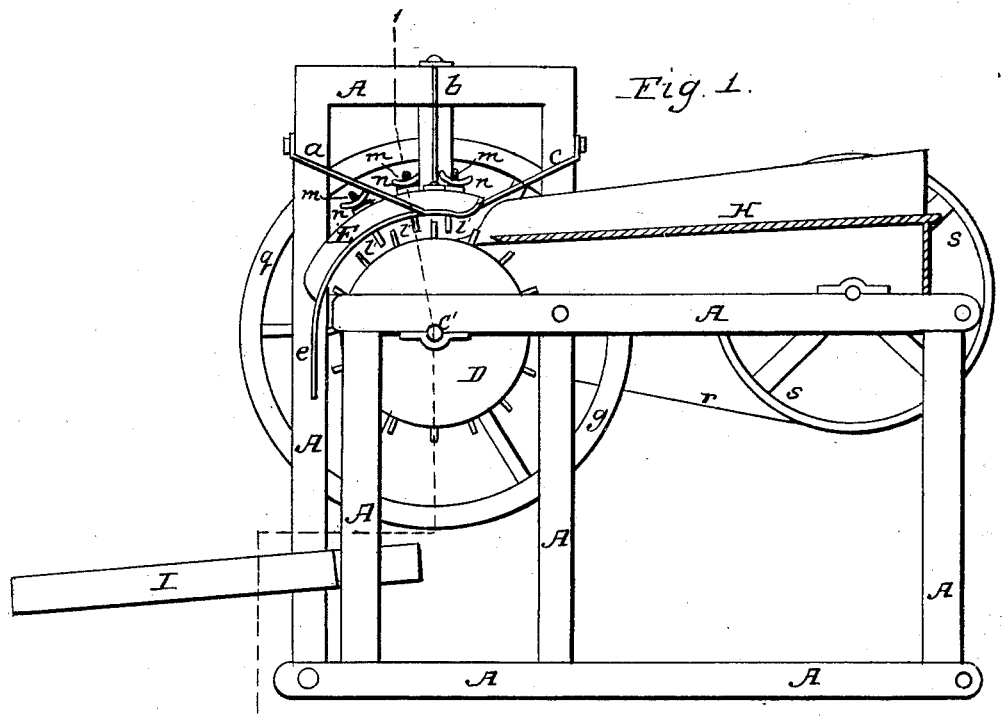
Figure 2:
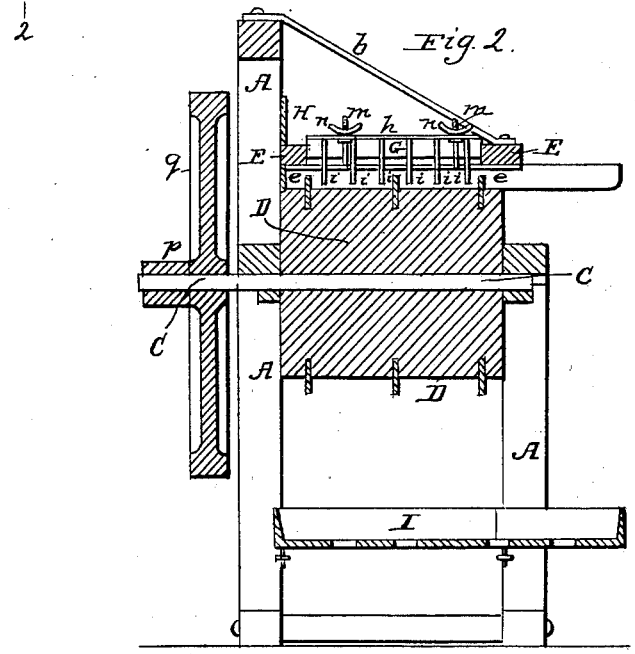

On reference to the accompanying drawing, which forms a part of this specification: Figure 1 is a side elevation of my improved threshing machine. Fig. 2 a transverse section on the line 1, 2. (Fig. 1.)

A is the framework of the machine. In suitable boxes, attached to this framework, turn the shafts B and C. To the latter is secured the spiked cylinder D, similar to those of other threshing machines.

E is the concave, one end of which only is attached to the framework, additional firmness and security being imparted to it by the diagonal braces $a$, $b$, and $c$. This concave has a metal lining $e$, which extends downward below the termination of the wooden upper work, so as to guide the threshed grain onto the platform I. In the concave are three oblong recesses, each of which terminates at the metal lining, and in each recess fits a wooden block G, furnished at the top with a plate $h$, to which are riveted the teeth $i$, $i$, the latter passing through openings in the lining $e$ of the concave, to which are attached the screws $m$, $m$. These pass freely through the block G, and are furnished with thumb nuts $n$, which are arranged to turn freely in the plate $h$, but to have no vertical movement, so that, by turning the nuts, the block G may be raised and lowered at pleasure, and the teeth consequently made to project more or less below the concave.

H is a table, on which the grain is placed, prior to being introduced between the concave and cylinder; and I is a perforated platform for receiving the threshed grain. The shaft C is furnished with a fly wheel $q$ and a small pulley $p$, around which passes a strap $r$ from a pulley $s$ on the shaft B.

In ordinary threshing machines, the entire heads and stalks of the grain are submitted to the action of the spiked cylinder, and the stalks become so mangled, as to render them unfit to be used for making paper, and for other manufacturing purposes. It has been customary, therefore, to thresh the grain, the stalks of which it is desirable to retain entire, by the ordinary flail.

By my above described machine, the grain is not only thoroughly and rapidly threshed, but the stalks remain whole. One attendant turns the wheel $s$ (or it may be turned by a belt) while another spreads the grain on the table H, presenting the heads only to the revolving cylinder. As the space between the concave and cylinder is open at one end, the stalks pass down with the heads while the latter are being threshed, the whole dropping onto the perforated platform I, from which the straw is collected and bound into bundles, the chaff and grain falling through the perforations to the ground.

I claim and desire to secure by Letters Patent—

Arranging the concave of a threshing machine in respect to the spiked roller substantially as herein set forth in order that the grain may be operated upon in the manner specified.

In testimony whereof I have signed my name to this specification before two subscribing witnesses.

HAMILTON E. SMITH.

Witnesses:
 HENRY HOWSON,
 HENRY ODIORNE.